(12) United States Patent
Heinisch et al.

(10) Patent No.: US 8,913,234 B2
(45) Date of Patent: Dec. 16, 2014

(54) MEASUREMENT OF THE POSITIONS OF CENTRES OF CURVATURE OF OPTICAL SURFACES OF A MULTI-LENS OPTICAL SYSTEM

(75) Inventors: Josef Heinisch, Wedel (DE); Stefan Krey, Pinneberg (DE); Eugen Dumitrescu, Wedel (DE); Aiko Ruprecht, Wedel (DE); Patrik Langehanenberg, Hamburg (DE)

(73) Assignee: Trioptics GmbH, Wedel (DE)

(*) Notice: Subject to any disclaimer, the term of this patent is extended or adjusted under 35 U.S.C. 154(b) by 379 days.

(21) Appl. No.: 13/302,697

(22) Filed: Nov. 22, 2011

(65) Prior Publication Data

US 2012/0133924 A1    May 31, 2012

(30) Foreign Application Priority Data

Nov. 29, 2010    (DE) .................... 10 2010 053 422

(51) Int. Cl.
G01N 21/00    (2006.01)
G01M 11/02    (2006.01)

(52) U.S. Cl.
CPC ................ *G01M 11/0221* (2013.01)
USPC .......................................... 356/73

(58) Field of Classification Search
USPC ............................ 356/73, 127, 505, 510, 515
See application file for complete search history.

(56) References Cited

U.S. PATENT DOCUMENTS 7,046,351 B2 * 5/2006 Ito ................................. 356/127
7,133,225 B1    11/2006 Freimann et al.
7,643,149 B2 * 1/2010 Freimann et al. ............. 356/458
7,760,365 B2 * 7/2010 Ueki .............................. 356/515
2012/0133951 A1 * 5/2012 Heinisch et al. .............. 356/498

FOREIGN PATENT DOCUMENTS

DE    10 2004 029 735    1/2006
DE    10 2005 013 571    6/2006
FR    280 302 7    6/2001

OTHER PUBLICATIONS

German Office Action dated Jul. 6, 2011, 6 pages.
German Office Action dated Aug. 10, 2011, 5 pages.
Wilhelm et al., "On-Axis Non-Contact Measurement of Glass Thicknesses and Airgaps in Optical Systems with Submicron Accuracy," Proc. of SPIE, vol. 6616, pp. 66163P-1 to 66163P-12 (2007).
Heinisch et al., "Novel Technique for Measurement of Centration Errors of Complex, Completely Mounted Multi-Element Objective Lenses," Proc. of SPIE, vol. 6288, pp. 628810-1 to 628810-7 (2006).
Alain Courteville et al., Non-Contact in-Process Metrology Using a High-Accuracy Low-Coherence Interferometer, 2005, FOGALE nanotech, France.

* cited by examiner

*Primary Examiner* — Jonathan Hansen
(74) *Attorney, Agent, or Firm* — Lempia Summerfield Katz LLC (57) ABSTRACT

A method measures the positions of centers of curvature of optical surfaces of a multi-lens optical system. The spacings between the surfaces are measured along a reference axis using an interferometer. Subsequently the centers of curvature of the surfaces are measured using an optical angle-measuring device. In the course of the measurement of the position of the center of curvature of a surface situated within the optical system, the measured positions of the centers of curvature of the surfaces situated between this surface and the angle-measuring device and the previously measured spacings between the surfaces are taken into consideration computationally. In this way, a particularly high accuracy of measurement is achieved, because desired spacings do not have to be fallen back upon.

18 Claims, 5 Drawing Sheets

MEASUREMENT OF THE POSITIONS OF CENTRES OF CURVATURE OF OPTICAL SURFACES OF A MULTI-LENS OPTICAL SYSTEM

CROSS-REFERENCE TO RELATED APPLICATION

This application claims priority of German patent application DE 10 2010 053 422.6 filed Nov. 29, 2010, the entire disclosure of which is incorporated herein by reference.

BACKGROUND OF THE INVENTION

1. Field of the Invention

The invention relates to a process and to an apparatus for measuring the positions of centres of curvature of optical surfaces of a multi-lens optical system.

2. Description of the State of the Art

In the course of the manufacture of high-quality multi-lens optical systems the lenses have to be oriented with respect to one another with high accuracy. In order to be able to carry out such an orientation it is necessary to determine the positions of the optical surfaces metrologically. Even if during the adjustment of the lenses a check of the positioning accuracy is dispensed with, such measurements are regularly carried out at least within the scope of quality control.

A crucial geometrical quantity in connection with the surveying of multi-lens optical systems is constituted by the positions of the centres of curvature of the optical surfaces. Ideally the centres of curvature lie exactly on a common reference axis which, as a rule, should coincide with the axes of symmetry of the lens mounts receiving the lenses. In real optical systems, however, in consequence of tolerances of manufacturing and assembly the centres of curvature are randomly distributed around this reference axis. If the spacings of the centres of curvature from the reference axis are too great, the imaging properties of the optical system deteriorate in intolerable manner.

A process for measuring centres of curvature of optical surfaces of a multi-lens optical system is known from DE 10 2004 029 735 A1. In this process the positions of the centres of curvature of the individual optical surfaces are measured successively with the aid of an autocollimator. The first surface for which the position of the centre of curvature is surveyed is that surface which is situated nearest to the autocollimator. As soon as the position of the centre of curvature of this first surface has been determined, the following, second surface is surveyed. However, the first surface influences the surveying of the second surface. For this reason, the optical effect of the first surface has to be taken into consideration computationally in the determination of the position of the centre of curvature of the second surface. In the consideration of the optical effect of the first surface the design data of the first surface are fallen back upon, and in particular the desired radius of curvature and the desired spacing with respect to the second surface (i.e. the centre thickness of the first lens). In addition, the previously measured position of the centre of curvature of the first surface is taken into consideration computationally.

The manner of proceeding is the same for all further surfaces. In the course of the computational evaluation the measured positions of the centres of curvature of all optical surfaces situated ahead, and otherwise the design data, are consequently always taken into consideration.

SUMMARY OF THE DISCLOSURE

The process for measuring the positions of centres of curvature of optical surfaces of a multi-lens optical system is improved, with the aim of a higher accuracy of measurement. Furthermore, an apparatus suitable for the implementation of such an improved process is disclosed.

In accordance with one aspect of the disclosure, a method for measuring the positions of centres of curvature of optical surfaces of a multi-lens optical system, includes the following steps:

a) measuring the spacings between the surfaces along a reference axis using an interferometer;

b) measuring the positions of the centres of curvature of the surfaces using an optical angle-measuring device, whereby in the course of the measurement of the centre of curvature of a surface situated within the optical system the measured positions of the centres of curvature of the surfaces situated between this surface and the angle-measuring device and the spacings between the surfaces measured in step a)

are taken into consideration computationally.

It has become evident that accuracy in connection with the measurement of the positions of the centres of curvature can be increased considerably if, in connection with the determination of the optical effect of the optical surfaces already surveyed, recourse is not had to desired spacings between the surfaces, i.e. data derived from the optical design, but rather if these spacings are measured with high accuracy using an interferometer. For whereas the radii of curvature, for instance, of the optical surfaces can, as a rule, be realised with very high precision in terms of manufacturing engineering, this holds only to a limited extent for the centre thicknesses of the lenses. Above all, in the course of assembly of the optical system, however, adjustment errors frequently occur in connection with the setting of the air separations between the lenses.

Since the actual spacings between the optical surfaces may consequently diverge distinctly from the desired spacings in some cases, when only the desired spacings are taken into consideration in the computational evaluation significant errors may occur in the determination of the positions of the centres of curvature.

In connection with the surveying of multi-lens optical systems, in addition the peculiarity appears here that measurement errors in the course of the surveying of an optical surface in consequence of the iterative evaluation process have a marked effect on the accuracy of measurement of all the optical surfaces situated downstream, viewed from the angle-measuring system. Expressed the other way round, all the measurement errors of the measurements carried out for the optical system in question enter cumulatively into the measured value for the position of the centre of curvature of the final surface of the optical system, viewed from the angle-measuring system. In this way, even relatively small deviations of the actual spacings from the desired spacings can have a very unfavourable effect at least on the accuracy of measurement of the final optical surfaces, viewed from the angle-measuring system.

By virtue of the implementation of an independent measurement of the spacings between the optical surfaces, in connection with the determination of the position of the centre of curvature of a particular optical surface it is possible no longer to have recourse to the desired spacings but rather to the actual spacings between those surfaces which are situated between this surface and the angle-measuring system. This results, particularly in the case of optical systems with many optical surfaces, in a considerable increase in the accuracy of measurement, above all for the 'rear' optical surfaces, i.e.

those surfaces, for the surveying of which the angle-measuring light has to pass twice in each instance through very many surfaces situated ahead.

In connection with the surveying of the positions of the centres of curvature in step b) it should be noted that the optical surfaces do not have to be surveyed in the order in which they are arranged in the optical system. This is because the computational consideration of the optical effect of the surfaces situated ahead of a particular surface can only be undertaken when all the measured data for the optical system have been recorded. The sequence in connection with the recording of the measured data may therefore also be established freely within wide limits in accordance with other criteria.

Such another criterion may be, for example, to keep the measuring-time as short as possible, by the displacement paths of optical components in the angle-measuring device being minimised. If in the case of the angle-measuring device it is a question, for instance, of an autocollimator, the sequence in connection with the recording of the measured data can be established in such a manner that the optical surfaces are measured not in the order of their arrangement in the optical system but rather in the order of the arrangement of their centres of curvature. Surveyed firstly is then, for example, not the optical surface arranged closest to the autocollimator but rather that surface having a centre of curvature that is situated as close as possible to the autocollimator. Next, that surface is then surveyed having its centre of curvature situated second-closest to the autocollimator, etc. In this way, the zoom optics of the autocollimator that are used for focusing only have to approach the consecutive desired positions of the points of curvature such as result from the design data of the optical system. Steps a) and b) may also be interchanged. Then, on the assumption of the desired spacings between the surfaces, the approximate positions of all the centres of curvature are then measured provisionally, as has hitherto been the case in the state of the art. After measurement of the spacings using the interferometer, these measured values are subsequently then corrected computationally, or step b) is repeated and the computational consideration of the spacings takes place in the course of the evaluation of the second measurement of the centres of curvature. A second measurement of the centres of curvature with more exact knowledge of the actual spacings between the optical surfaces can frequently be carried out with greater accuracy of measurement.

The measurement of the spacings between the surfaces using the interferometer, however, does not only improve accuracy in connection with the surveying of the positions of the centre of curvature. Conversely, the measurement of the positions of the centres of curvature also enables the spacings between the surfaces to be surveyed more accurately. This is because an accurate surveying of the spacings between the surfaces with the aid of the interferometer is possible only if the spacing-measuring light directed from the interferometer onto the surfaces impinges perpendicularly onto the surfaces to be surveyed. In the case of an only slight tilting of the surfaces, the intensity of the light reflected back into the interferometer from the surfaces is diminished so considerably that, in consequence of the then very low signal-to-noise ratio, no measurement, or at best a comparatively inaccurate measurement, is possible. In addition, in the case of non-perpendicular impingement of the spacing-measuring light, even when the reflected light has a sufficiently high intensity, ultimately it is not the actually desired spacing between the surfaces along the optical axis that is measured. But this goes unnoticed and for this reason is particularly disadvantageous.

The spacing-measuring light impinges perpendicularly onto the optical surfaces if the optical axis of the optical system is aligned with the reference axis along which the spacings are measured. For this reason, in an advantageous configuration of the method an optical axis of the optical system is provisionally determined prior to the surveying of the spacings in accordance with step a) using the angle-measuring device. Subsequently the optical system and the interferometer are oriented with respect to one another in such a way that the provisionally determined optical axis is aligned with the reference axis. Generally in this connection the optical system will be adjusted relative to the fixed interferometer. But in principle an adjustment of the interferometer relative to the fixed optical system is also possible.

The optical axis of an imperfectly adjusted multi-lens optical system is, in itself, not unambiguously defined. For this reason, by a 'provisionally determined optical axis' of such a system an axis is understood here that, according to a criterion determined in advance, has been defined as the provisional optical axis. This criterion determined in advance describes qualitatively the property that the provisionally measured centres of curvature, for instance in the sense of a regression line, are situated close (as close as possible) to this axis.

In order to determine the optical axis of the optical system provisionally, step b) may be carried out prior to step a). The positions of the centres of curvature measured in step b) are then used for the provisional determination of the optical axis.

The optical axis may, for example, be determined provisionally by the positions of the centres of curvature of at least some surfaces being measured and by the optical axis being established by a regression line through the centres of curvature determined in this way. If only two surfaces are used for determining the provisional optical axis, for example the first and last surfaces of the optical system, the regression line turns into a connecting line.

It is also possible to weight individual surfaces in connection with the establishment of the provisional optical axis. One possibility which enters into consideration is to weight more heavily the more strongly refracting surfaces, that is to say, the surfaces with smaller radii of curvature, since these surfaces generally have a greater influence on the optical properties of the optical system. Another possibility which enters into consideration is to consider only individual portions of the optical system in connection with the provisional determination of the optical axis.

Another possibility for provisionally determining the optical axis consists in coupling in test light from one side of the optical system and, on the opposite side, in registering, in location-resolved manner by means of a light-sensor of the angle-measuring device, test light emanating from the optical system. In this connection the fact is exploited that in the case of misadjusted optical surfaces the test light is deflected by refraction and for this reason does not strike the light-sensor at the point of intersection of the reference axis.

Such a provisional determination of the optical axis succeeds particularly efficiently if the optical system is rotated about the reference axis during the location-resolved registering of the test light. From the change in the location of impingement of the test light on the light-sensor during the rotation, the deviation of the optical axis from the reference axis can then be inferred qualitatively. For during the rotation of the optical system the location of impingement of the test light on the light-sensor moves on a circular path. An optimal orientation of the optical system with respect to the reference axis is obtained when the radius of the circular path is minimal.

The test light may, for example, have been generated by a light-source arranged in the interferometer. In the case of this light-source it may be a question of the light-source that is provided in the interferometer anyway for the spacing-measuring light, or of a source of test light that is independent thereof.

A further possibility for orienting the optical system prior to the start of the actual measurement of the centres of curvature with respect to the reference axis consists in calculating, using the centres of curvature ascertained by the angle-measuring device, the intensities that spacing-measuring light generated by the interferometer has after reflection on the optical surfaces if the provisionally determined optical axis established by the centres of curvature is optimally aligned with the reference axis. The optical system is then oriented by tilting and/or displacing in such a way that the intensities measured by the interferometer come as close as possible to the calculated intensities.

In one embodiment the measurement of the spacings in step a) and the measurement of the positions of the centres of curvature in step b) are carried out from the same side of the optical system. As a result, a more compact structure of the measuring apparatus can frequently be achieved.

The spacing-measuring light used by the interferometer and angle-measuring light used by the angle-measuring device may in this connection be directed onto the optical system by the same focusing optics.

The disclosed methods also permit positions of centres of curvature to be measured in the case of aspherical surfaces. The centre of curvature in this case is defined only with respect to the spherical portion of the aspherical surface. In the case of an aspherical surface which is describable by the conventional aspheric equation $$z = \frac{ch^2}{1+\sqrt{1-(1+k)c^2h^2}} + Ah^4 + Bh^6 + Ch^8 + Dh^{10} + Eh^{12} + Fh^{14} + Gh^{16} + Hh^{18} + Jh^{20}$$

the centre of curvature is given by the centre of a sphere with radius of curvature R. In the equation, z denotes the sagitta of the surface in question parallel to the optical axis, h denotes the radial spacing from the optical axis, c=1/R denotes the curvature at the vertex of the surface in question, k denotes the conic constant, and A, B, C, D, E, F, G, H and J denote aspheric constants. The position of an axis of symmetry, with respect to which an aspherical surface is rotationally symmetrical and on which the centre of curvature of the spherical portion may be situated, but does not necessarily have to be, cannot, on the other hand, be ascertained by the method according to the invention. Plane surfaces can also be surveyed with the aid of the disclosed methods. However, in this case the angle-measuring device provides not positions of centres of curvature but rather the angles that the plane surface includes with respect to the reference axis.

With regard to one aspect of the disclosure, an apparatus for measuring the positions of centres of curvature of optical surfaces of a multi-lens optical system, includes:
a) an interferometer that is configured to measure spacings between the surfaces along a reference axis,
b) an optical angle-measuring device that is configured to measure the positions of the centres of curvature of the optical surfaces,
c) a computing unit which in connection with the measurement of the position of the centre of curvature of a surface situated within the optical system is configured to take into consideration computationally
   the measured positions of the centres of curvature of the surfaces situated between this surface and the angle-measuring device and
   the spacings between the surfaces measured by the interferometer.

The configurations and advantages stated above with respect to the method apply here correspondingly.

The apparatus may exhibit a source of test light that is configured to couple test light into the optical system from one side of said system. Furthermore, a location-resolving light-sensor may have been provided that is configured to register, in location-resolved manner, test light emanating on the opposite side of the optical system. In particular, the source of test light may have been integrated into the interferometer.

In addition, the apparatus may exhibit a rotating mechanism that is configured to rotate the optical system about the reference axis.

The interferometer and the angle-measuring device may have been arranged on the same side of the optical system. In this case focusing optics may be provided, through which both spacing-measuring light generated by the interferometer and angle-measuring light generated by the angle-measuring device are directed onto the optical system.

BRIEF DESCRIPTION OF THE DRAWINGS

Further features and advantages of the invention will become apparent from the following description of the embodiments on the basis of the drawings.

DESCRIPTION OF PREFERRED EMBODIMENTS

1. Introduction

Figure 1:
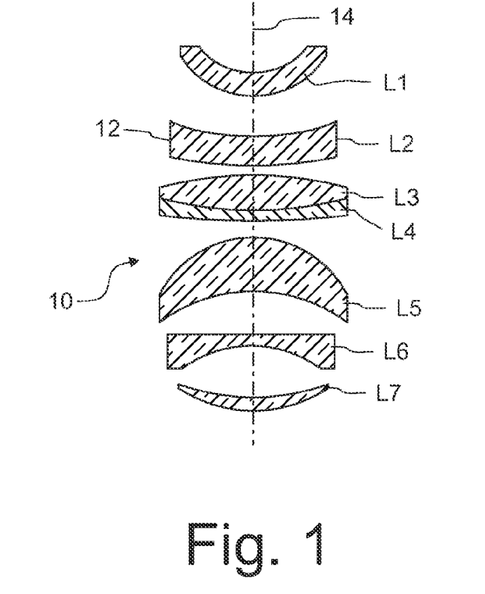
FIG. 1 is a meridional section through a multi-lens optical system wherein all the lenses are oriented perfectly with respect to a reference axis.

FIG. 1 shows, in a meridional section, an optical system denoted overall by 10, which comprises seven lenses L1 to L7. The two lenses L3 and L4 have been joined together in gap-free manner and form a doublet which is used as an achromat. The lenses L1 to L7 have a cylindrically ground lens rim 12 which in each instance is received in a lens mount which is not represented.

In the ideal case the lenses L1 to L7 have been oriented in such a way that their optical axes all lie on a common reference axis 14 which at the same time is the axis of symmetry of the cylindrical lens rims. The reference axis 14 is then generally designated as the optical axis of the optical system 10.

Figure 2:
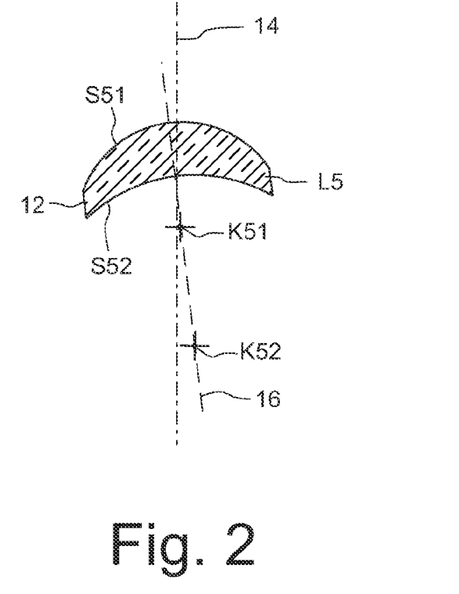
FIG. 2 is an individual lens from the optical system shown in FIG. 1, which, however, is tilted in relation to the reference axis.

In real optical systems, however, deviations from such an ideal orientation occur by reason of tolerances of manufacture and assembly. FIG. 2 shows in exemplary manner for lens L5 how a slight (in FIG. 2, however, represented in exaggerated manner) tilting of lens L5 in the lens mount has an effect on the centring state. Let it be assumed here that the two lens surfaces S51 and S52 of lens L5 are spherical and have centres of curvature that are denoted in FIG. 2 by K51 and K52, respectively. The centres of curvature K51 and K52 define the optical axis of lens L5, which in FIG. 2 is indicated by a dashed line 16. In consequence of this definition, the optical axis 16 always runs perpendicularly with respect to the spherical optical surfaces S51, S52 of lens L5.

In the case of aspherical lenses the optical axis is defined by the centres of curvature of the spherical portion of the aspherical lens surfaces.

The tilting of lens L5 may, for example, have been caused by virtue of the fact that lens L5 was not inserted into its lens mount correctly. As a reason for this, the possibility that the lens rim 12 was not ground in such a way that its axis of symmetry is aligned with the optical axis 16 of lens L5 enters into consideration, for instance.

In order to orient lens L5 correctly on the reference axis 14 of the optical system 10, lens L5 would have to be tilted and, where appropriate, additionally displaced perpendicularly with respect to the reference axis 14 in such a way that the optical axis 16 is aligned with the reference axis 14, as was assumed in FIG. 1.

Figure 3:
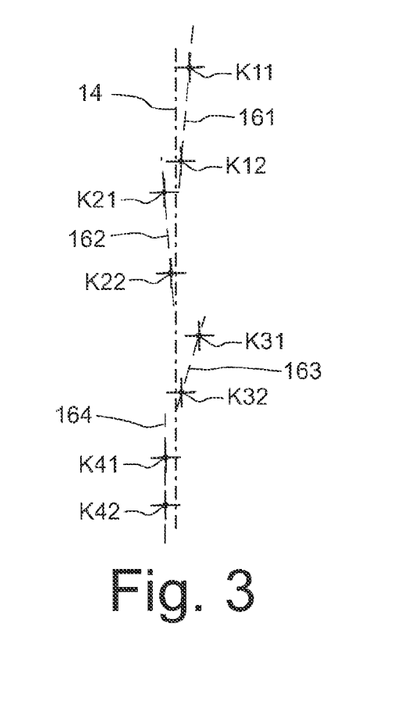
FIG. 3 is a schematic representation of the centres of curvature of a multi-lens optical system.

In the case of a multi-lens optical system such as is shown in FIG. 1, the optical axes of the individual lenses generally lie, depending on the quality of the centring state, more or less irregularly distributed with respect to the reference axis 14. This is indicated in exemplary manner in FIG. 3 for an optical system with four lenses with centres of curvature K11, K12, K21, K22, K31, K32 and K41, K42; the optical axes of the four lenses are denoted by 161, 162, 163, 164. In order in such an optical system to improve the centring of the lenses, several lenses have to be tilted and/or relocated by translation, in order that all the optical axes 161, 162, 163, 164 are aligned with the reference axis 14.

Figure 4:
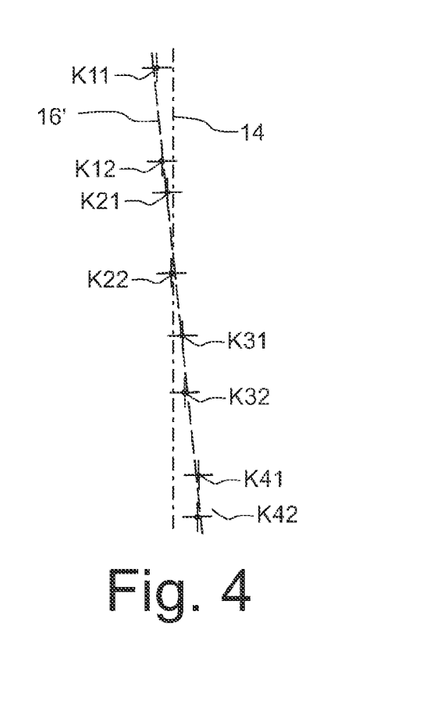
FIG. 4 is a schematic representation as in FIG. 3, wherein, however, the centres of curvature lie on a straight line that is different from the reference axis.

Occasionally it may also happen, as FIG. 4 shows, that although the optical axes of the lenses are arranged (at least approximately) on a common optical axis 16', the latter is not aligned with the reference axis 14. In such a case it may be more favourable not to readjust the individual lenses but to incorporate the entire optical system into a superordinate unit in such a way that it is adjusted not with respect to its reference axis 14, which, for example, may have been predetermined by lens mounts or by an objective housing, but with respect to its optical axis 16' in the superordinate unit.

In order, where appropriate, to be able to readjust individual lenses of an optical system or the optical system as a whole, but also for regular quality assurance, a measuring apparatus according to one embodiment is employed with which the positions of the centres of curvature of the optical surfaces can be measured with high accuracy. From the positions of the centres of curvature it is possible for the locations of the optical axes of the individual lenses and the deviation thereof from a reference axis 14 to be determined. Furthermore, it is possible to determine quantities derived therefrom, for instance the radii of curvature of the optical surfaces. In the following section 2, firstly the structure of the measuring apparatus according to one embodiment will be elucidated with reference to FIGS. 5 to 8, before the measuring process is dealt with in section 3.

2. Structure of the Measuring Apparatus

Figure 5:
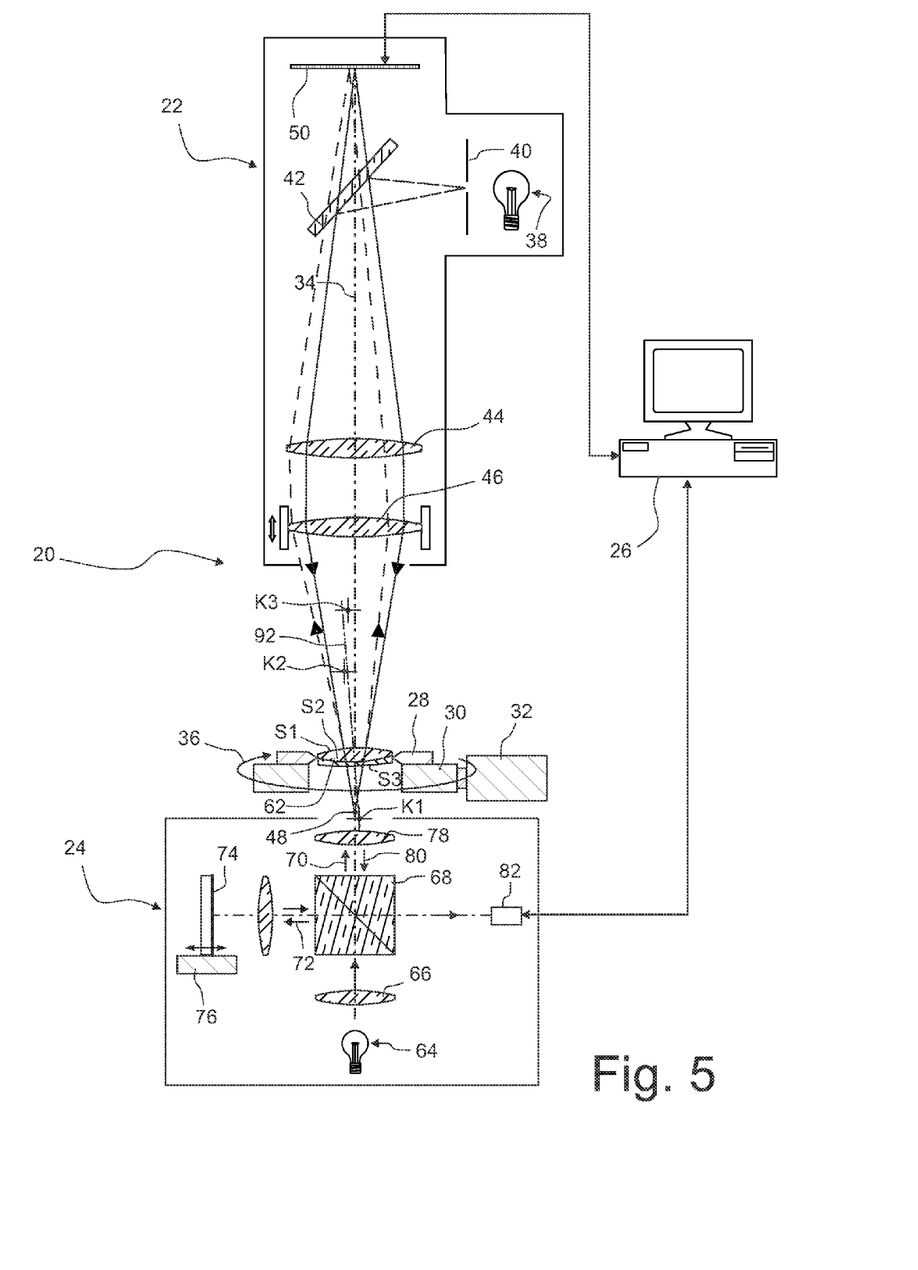
FIG. 5 is a meridional section through a measuring apparatus according to a first embodiment.

The measuring apparatus shown in FIG. 5 in a meridional section and denoted overall by 20 includes an autocollimator 22 used as angle-measuring device, an interferometer 24 used as spacing-measuring device, and a computing unit in the form of a computer 26. The measuring apparatus 20 further includes a test-specimen receptacle 28 which is held by an annular rotating table 30. The rotating table 30, together with the test-specimen receptacle 28 arranged thereon, is rotatable about a reference axis 34 with the aid of a motor 32, as indicated by an arrow 36. The rotary table 30 constitutes, together with the motor 32, a rotating mechanism of the measuring apparatus 20.

The autocollimator 22 includes a light-source 38 which illuminates a pinhole diaphragm 40 with angle-measuring light. The angle-measuring light emanating from the pinhole diaphragm 40 is directed via a beam-splitter 42 onto a collimator lens 44 and leaves the latter as an axially parallel ray bundle. A zoom lens 46 which is displaceable along the reference axis 34 concentrates the axially parallel angle-measuring light at a focal point 48. At the focal point 48 an image of the pinhole diaphragm 40 consequently arises. If instead of the pinhole diaphragm 40 a diaphragm with a differently shaped aperture, for example a cross-slit aperture, is chosen, an image of the cross slit arises in the focal plane of the zoom lens 46.

On the rear side of the beam-splitter 42 an image sensor 50 is arranged, by which here a light-sensitive location-resolving sensor is understood. Suitable as image sensor are, for example, CCD sensors or CMOS sensors known as such.

Figure 6:
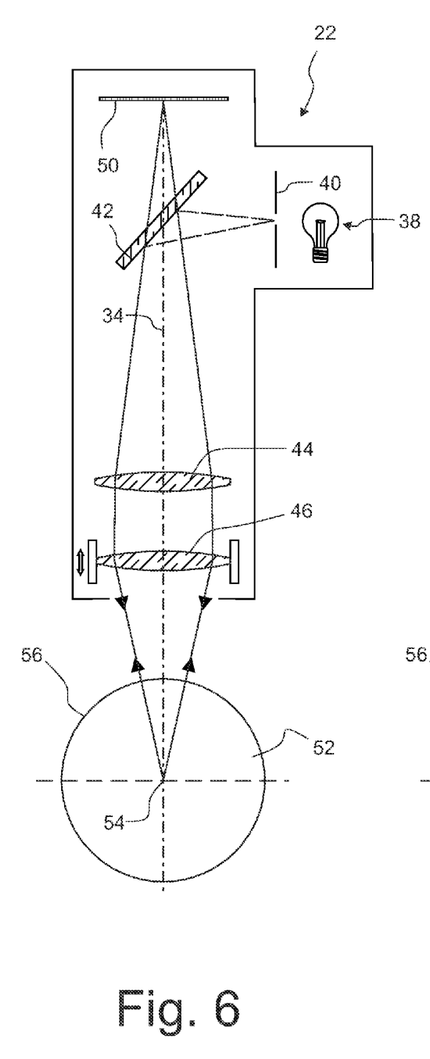
FIG. 6 is a meridional section through an autocollimator used in the measuring apparatus in the course of the surveying of a spherical lens oriented exactly on the reference axis.

The operation of the autocollimator 22 will be elucidated in the following with reference to FIGS. 6 and 7. The angle-measuring light emanating from the autocollimator 22 is here directed onto a test specimen, in the case of which it is a question, for the sake of simplicity, of a sphere 52. If the image of the pinhole diaphragm 40 lies exactly at the centre 54 of the sphere 52, this means that the angle-measuring light emerging from the autocollimator 22 always falls perpendicularly onto the surface 56 of the sphere 52. Consequently this angle-measuring light is reflected back into itself on the surface 56 of the sphere, passes through the zoom lens 46, the collimator lens 44 and, in part, also the beam-splitter 42, and generates on the image sensor 50 an image of the pinhole diaphragm 40, which is centred with respect to the reference axis 34.

Figure 7:
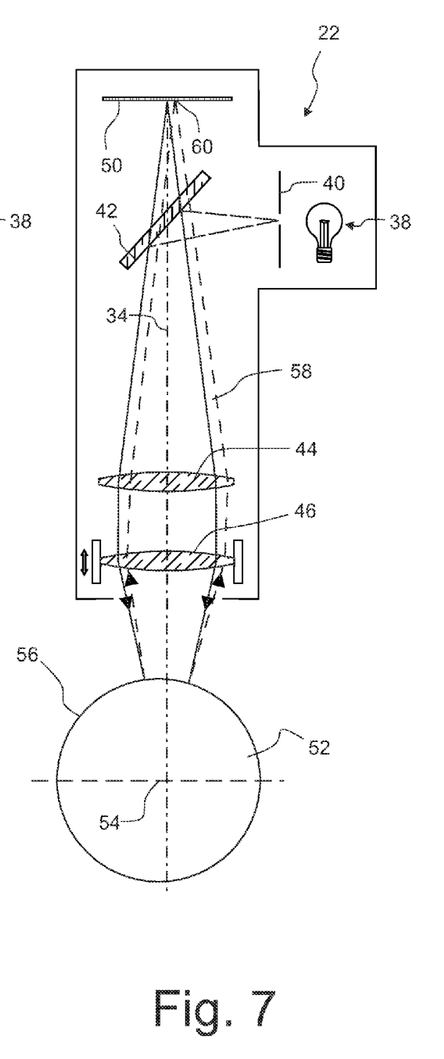
FIG. 7 is the autocollimator from FIG. 6, but with decentred spherical lens.

FIG. 7 shows the beam path for the case where the sphere 52 has been relocated perpendicularly with respect to the reference axis 34. In consequence of this relocation, the rays of light now no longer impinge perpendicularly onto the surface 56 of the sphere 52 and are for this reason also not reflected back into themselves. For this reason, the reflected angle-measuring light 58, indicated in dashed manner in FIG. 7, generates on the image sensor 50 an image 60 of the pinhole diaphragm 40, which has been displaced perpendicularly with respect to the reference axis 34.

If the sphere 52 is now rotated on the rotating table 30 about the reference axis 34, the image 60 describes a circular path on the image sensor 50. From the location of the central point of this circular path relative to the reference axis it is possible to ascertain where the centre 54 of the sphere 52 lies relative to the reference axis 34.

Since the decentring of the sphere 52 ultimately signifies a tilting of the part of the surface 56 facing towards the autocollimator 22, the autocollimator 22 ultimately measures the angle that the surface 56 of the sphere 52 includes with respect to the reference axis 34. For this reason, the autocollimator represents an angle-measuring device in the wider sense. Accordingly, other angle-measuring devices operating in non-contacting manner may also be employed instead of the autocollimator 22.

In the case of lenses with spherical surfaces, this measuring procedure operates in the same way, only the measurement does not yield, as in the case of a sphere, the position of a centre of the sphere but rather yields the position of the centre of curvature of the spherical surface in question.

In the following, reference will again be made to FIG. 5. In the embodiment shown therein it is assumed, for the sake of simplicity, that the test specimen denoted by 62 consists only of the doublet shown in FIG. 1, which is composed of lenses L3 and L4. The test specimen 62 consequently has three optical surfaces S1, S2 and S3 to be surveyed, the centres of curvature of which are denoted by K1, K2 and K3. As can be discerned in FIG. 5, these centres of curvature K1, K2 and K3 lie neither on the reference axis 34 nor exactly on another straight line.

In the following the structure of the interferometer 24 will be elucidated in more detail. The interferometer 24 takes the form of a short-coherence interferometer and for this purpose includes a light-source 64 which in comparison with a source of laser light is spectrally broadband and in the case of which it may be a question, for example, of a superluminescent diode. In consequence of the comparatively large spectral bandwidth, the light generated by the light-source 64 has a substantially shorter coherence length than light that is generated by sources of laser light. Alternatively, use may also be made of a source of laser light that generates extremely short pulses of light, since such pulses of light also have a very short coherence length.

Spacing-measuring light generated by the light-source 64 is concentrated by a converging lens 66 and directed onto a beam-splitter cube 68 which splits up the spacing-measuring light into a measuring-light ray 70 directed onto the test specimen 62 and into a reference-light ray 72. The reference-light ray 72 is reflected into itself by a mirror 74 which with the aid of an actuator 76 is displaceable along the beam direction. In this way, it is possible for the optical path length of the reference-light ray 72 between the beam-splitter cube 68 and the mirror 74 to be changed.

The measuring-light ray 70 is directed onto the test specimen 62 via optics 78. The measuring light 80 reflected on the optical surfaces S1, S2 and S3 gets back to the beam-splitter cube 68 via the optics 78 and is partly reflected from said cube in the direction of a photodetector 82. Therein the reflected measuring light 80 is superimposed with the reference-light ray 72 reflected from the mirror 74.

If the difference of the optical path lengths that the measuring-light ray 70 and the reference-light ray 72 have travelled as far as their path towards the photodetector 82 is of the order of magnitude of the coherence length of the spacing-measuring light generated by the light-source 64, interference phenomena occur which are registered by the photodetector 82. Since the coherence length of the spacing-measuring light generated by the light-source 64 is short, the photodetector 82 generates output signals that are sharply limited in terms of path length if the aforementioned condition is satisfied.

Figure 8:
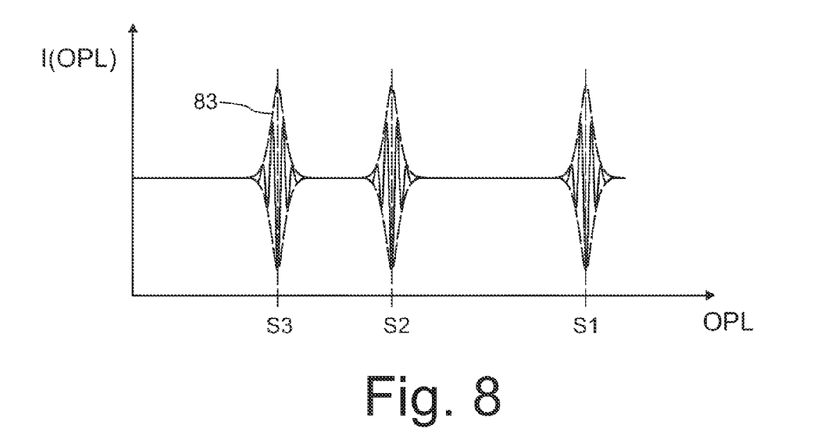
FIG. 8 is a graph in which the intensity registered by a photodetector during a spacing measurement has been plotted as a function of the optical path length that is travelled by a reference-light ray of an interferometer of the measuring apparatus.

FIG. 8 shows in exemplary manner a graph in which the intensity I registered by the photodetector 82 has been plotted over the optical path length OPL that the reference-light ray 72 travels. This optical path length is changed by displacing the mirror 74 during the measurement. Whenever the optical path lengths of the measuring-light ray 70 and of the reference ray 72 correspond, it is possible for an interference signal to be registered at the photodetector 82. On the abscissa the surfaces S3, S2 and S1 are specified that have resulted in the corresponding interference signals at the photodetector 82.

From the positions of the maxima of the envelope curves 83 of the measuring signals it is possible for the spacings between the surfaces S1, S2 and S3 to be determined with very high accuracy, taking the group refractive index into consideration.

In the case of real measuring signals, further interference signals generally lie between the envelope curves 83, which, for example, have been caused by multiple reflections within the test specimen 62 and in some cases may attain relatively high levels. In order that such interfering signals do not impair the measurement, the interfering signals can be masked out with the aid of discriminator windows which are placed around the envelope curves 83. The discriminator windows are preferentially positioned automatically where interference signals are to be expected, taking the desired spacings between the surfaces S1, S2, S3 as a basis. In order that as much measuring light as possible can be reflected from the surfaces S1, S2, S3 of the test specimen 62 and fed to the photodetector 82, the measuring-light ray 70 can be adapted to the test specimen 62 with the aid of the optics 78.

Further particulars relating to the surveying of thicknesses of transparent bodies with the aid of a short-coherence interferometer can be gathered from FR 2 803 027 A1. Short-coherence interferometers that are suitable in principle are offered for sale, inter alia, by FOGALE nanotech, Nîmes, France.

Figure 9:
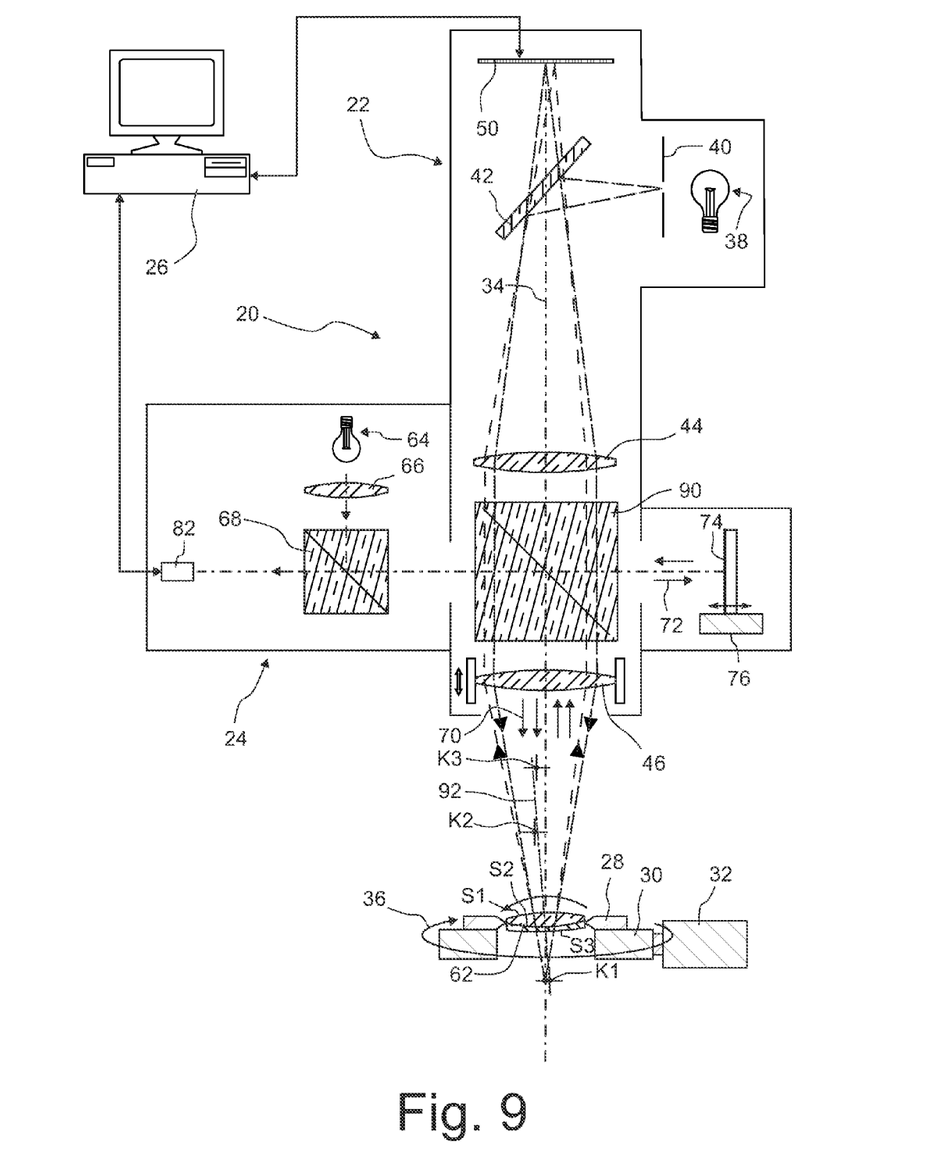
FIG. 9 is a meridional section through a measuring apparatus according to another embodiment wherein the interferometer and the autocollimator are arranged on the same side of the test specimen.

FIG. 9 shows a measuring apparatus 20 according to another embodiment wherein the interferometer 24 is arranged on the same side of the test specimen 62 as the autocollimator 22. Accordingly, the measurements of the positions of the centres of curvature K1, K2, K3 of the optical surfaces S1, S2, S3 and of the spacings thereof from one another are carried out from the same side of the test specimen 62.

For this purpose the measuring apparatus 20 exhibits a second beam-splitter cube 90 which splits up the light reflected from the first beam-splitter cube 68 into the measuring-light ray 70 and the reference ray 72. In this embodiment the first beam-splitter cube 68 merely has the task of coupling the light generated by the light-source 64 into that arm of the interferometer 24 which contains the photodetector 82. In this embodiment the zoom lens 46 serves for focusing both the angle-measuring light and the spacing-measuring light 70.

Otherwise the measuring apparatuses 20 shown in FIGS. 5 and 9 are functionally identical.

3. Measuring Process

Figure 10:
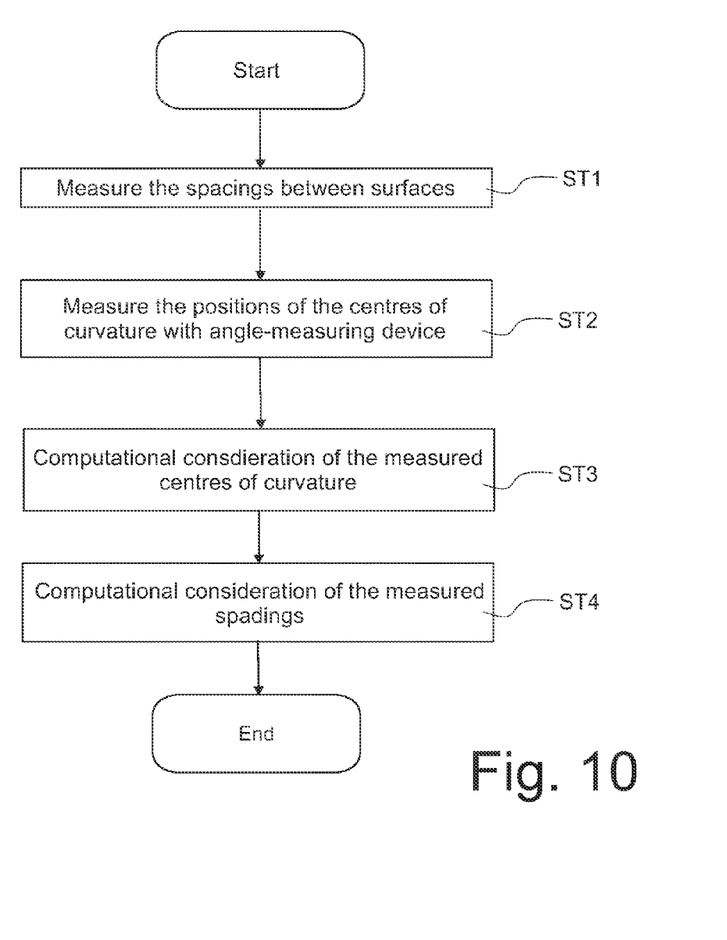
FIG. 10 is a flow chart for elucidating important steps of the method according to one embodiment.

In the following the measuring process according to one embodiment will be elucidated in more detail with reference to the flow chart shown in FIG. 10.

a) Preadjustment

It will firstly be presupposed that the optical axis of the autocollimator 22, the axis of rotation of the rotating table 30 and the measuring-light ray 70 of the interferometer 24 have been oriented with respect to one other in such a way that they lie on the common reference axis 34. Such an adjustment is undertaken once only prior to putting the measuring apparatus 20 into operation for the first time.

In order firstly to achieve a parallelism of the axis of rotation of the rotating table 30 with the optical axis of the autocollimator 22, a plane mirror can be placed over the aperture in the rotating table 30. The autocollimator 22 and the rotating table 30 are then adjusted with respect to one another until such time as the image of the pinhole diaphragm 40 on the image sensor 50 is centred exactly with respect to the optical axis of the autocollimator 22.

In a second step, a spherical lens is inserted into the aperture in the annular rotating table 30 in order to achieve an exactly coaxial orientation of the optical axis of the autocollimator 22 and of the axis of rotation of the rotating table 30. The autocollimator 22 and the rotating table 30 are then adjusted with respect to one another until such time as the image of the pinhole diaphragm 40 on the image sensor 50 is again centred with respect to the optical axis of the autocollimator.

In similar manner the interferometer 24 can also be oriented relative to the rotating table 30. An optimal orientation with respect to the common reference axis 34 is obtained when the intensity registered by the photodetector 82 is maximal in the given case when a plane mirror and a spherical lens are employed.

b) Spacing Measurement

For the purpose of measuring the positions of the centres of curvature of the multi-lens test specimen 62, firstly in a step ST1 the spacings between the surfaces S1, S2, S3 are measured with the aid of the interferometer 24. In order to obtain reproducible and accurate results of measurement, however, in this case the measuring-light ray 70 of the interferometer 24 has to be oriented very accurately with respect to the optical axis of the test specimen 62. For only if the measuring-light ray 40 falls perpendicularly onto the optical surfaces S1, S2, S3 does sufficient measuring light reflected from the surfaces S1, S2, S3 get back to the photodetector 82 where it can contribute to the interference with the reference-light ray 72. This, in turn, is tantamount to the requirement that the centres of curvature K1, K2, K3 lie on the reference axis 34.

In general, however, this prerequisite does not obtain, because the test specimen 62 is firstly held tilted and/or decentred on the rotating table 30, as shown in FIG. 5. For this reason it will generally be necessary to orient the test-specimen receptacle 28 with the test specimen 62 received therein relative to the interferometer 24 firstly in such a way that the optical axis of the test specimen 62 defined by the centres of curvature K1, K2, K3 is aligned with the reference axis 34. In the case of an interferometer 24 that has already been preadjusted, this means that the test-specimen receptacle 28 with the test specimen 62 is tilted and/or displaced on the rotating table 30.

However, the optical axis of the test specimen 62 is not known at all to begin with. For this reason, prior to the orientation of the test specimen 62 relative to the interferometer 24 it is necessary to determine the optical axis of the test specimen 62 provisionally. Several possibilities enter into consideration for this purpose.

i) Provisional Measurement of the Positions of the Centres of Curvature

One possibility consists in determining the positions of the centres of curvature of the surfaces S1, S2, S3 provisionally already prior to the measurement of the spacings, and in deriving therefrom an optical axis of the test specimen 62. How the positions of the centres of curvature are measured with the aid of the autocollimator 22 will be elucidated in more detail further below in section 3.c).

The derivation of an optical axis of the test specimen 62 from provisionally determined centres of curvature K1, K2, K3 can be undertaken in various ways. For instance, a regression line, which is defined as the optical axis of the test specimen 62, can be placed through the centres of curvature K1, K2, K3. In connection with the definition of the regression line, a weighting of the centres of curvature K1, K2, K3 can also be undertaken, said weighting being adapted, for example, to the radii of curvature of the surfaces in question. In FIG. 5 a provisional optical axis determined in such a way is indicated by a dashed line and denoted by 92.

Since the determination of the optical axis 92 is merely provisional and does not require the highest accuracy, the optical axis 92 can also be defined in simpler manner. For instance, only the centres of curvature K1 and K3 of the first surface S1 and of the last surface S3, respectively, may be taken into consideration in such a manner that the provisional optical axis runs through these centres of curvature.

ii) Measurement in Transmission

Another possibility for determining the optical axis 92 of the test specimen 62 provisionally consists in transilluminating the test specimen 62 in transmission. For this purpose the white-light source 64 of the interferometer 24 is utilised in order to direct a test-light ray onto the test specimen 62. The test-light ray passes trough the test specimen 62 and also the zoom lens 46, the collimator lens 44 and the beam-splitter 42, and generates a spot of light on the image sensor 50. If the centres of curvature K1, K2, K3 lie on the reference axis 34, the test-light ray passes through the optical surfaces S1, S2, S3 perpendicularly and consequently propagates rectilinearly along the reference axis 34.

In general, however, the centres of curvature K1, K2, K3 do not lie exactly on the reference axis 34. The test-light ray then impinges onto the surfaces S1, S2, S3 not perpendicularly but obliquely, so that when passing through the test specimen 62 it is deflected in consequence of refraction on the surfaces S1, S2, S3. In consequence of this deflection, the spot of light on the image sensor 50 is also relocated away from the reference axis 34.

Now if during such a transillumination of the test specimen 62 with test light the test specimen 62 is rotated about the reference axis 34 with the aid of the rotating table 30, the spot of light on the image sensor 50 also migrates around the reference axis 34. From the path of this spot of light, however, the positions of the centres of curvature K1, K2, K3 cannot be inferred quantitatively. However, if the test-specimen receptacle 28 with the test specimen 62 received therein is tilted and/or displaced for such time until the circular path of the spot of light on the image sensor 50 has a minimal diameter, the spacing of the centres of curvature K1, K2, K3 from the reference axis 34 is also minimal. The optical axis of the test specimen 62 is then oriented well in the desired manner with respect to the reference axis 34 of the measuring apparatus 20.

iii) Simulation

A further possibility for adjusting the test specimen 28 on the rotating table 30 consists in determining the positions of the centres of curvature K1, K2, K3 of the surfaces S1, S2, S3 of the test specimen 62 provisionally, in a manner similar to that in variant i), with the aid of the autocollimator 22. By means of a simulation, for example by means of ray-tracing processes, it is then ascertained which intensities would be registered at the photodetector 82 if the test specimen 62 with the centres of curvature K1, K2, K3 measured in advance were optimally oriented with respect to the rotating table 92. Such an optimal orientation may have been defined by virtue of the fact that the centres of curvature K1, K2, K3 are then located, on average, as close as possible to the reference axis 34; where appropriate, a modified criterion may also be used here. The tilting and/or displacement of the test specimen 62 on the rotating table 30 is then carried out until such time as the intensities calculated in advance are registered by the photodetector 82.

So after the test specimen 62 has been oriented optimally with respect to the reference axis 34 of the measuring apparatus 20 in accordance with one of the three variants i) to iii) elucidated above, the spacings between the surfaces S1, S2, S3 are measured with the aid of the interferometer 24. For this purpose the optical path length of the reference-light ray 72 is tuned, in the manner already described above, by displacing the mirror 74, and the interference signal of the photodetector 82 is registered and evaluated.

c) Measuring the Positions of the Centres of Curvature

In a second step ST2 the positions of the centres of curvature K1, K2, K3 of the surfaces S1, S2, S3 are surveyed with the aid of the autocollimator 22. In this connection the procedure is as follows:

In order in the case of a multi-lens test specimen 62 to measure the positions of the centres of curvature K1, K2, K3 of the optical surfaces S1, S2, S3, several measuring procedures have to be carried out in succession. In this regard a start is made, for example, with that optical surface which is situated closest to the autocollimator 22. In the case of the test specimen 62, this is surface S1.

For the purpose of determining the position of the centre of curvature of surface S1, the zoom lens 46 of the autocollimator 22 is displaced in such a way that the focal point 48 of the angle-measuring light is situated in the vicinity of the centre of curvature that is expected on the basis of the design data. Then the rotating table 30 is set in rotation, and the migration of the image of the pinhole diaphragm 40 on the image sensor 50 is recorded. As already elucidated above in section 2 with reference to FIGS. 6 and 7, the position of the centre of curvature K1 of surface S1 can be derived from the central point of the circular path on which the image of the pinhole diaphragm 40 on the image sensor 50 migrates during the rotation of the test specimen about the reference axis 34.

After the position of the centre of curvature K1 of the first surface S1 has been ascertained, the zoom lens 46 is displaced in such a way that the focal point 48 of the angle-measuring light comes to be situated at least approximately at the centre of curvature K2 of the following surface S2 in the direction of propagation of light. But since the angle-measuring light emanating from the autocollimator 22 now additionally also passes through surface S1 which has already been surveyed beforehand, the measured values obtained in the course of the second measurement have to be computationally corrected by the optical effect of the first surface S1. In this connection, in a step ST3 the position of the centre of curvature K1 of the already surveyed surface S1 is taken into consideration computationally, and in a step ST4 the spacing between the two surfaces S1 and S2 along the reference axis 34, already measured with the aid of the interferometer 24, is taken into consideration computationally, whereby steps ST3 and ST4 will generally be part of a common corrective calculation at the end of the entire measuring procedure.

In connection with the determination of the optical effect of the first surface S1, as a rule the radius of curvature of this surface is needed. In the case of spherical lenses, the radii of curvature can be derived directly from the positions of the centres of curvature K1, K2, K3 and from the spacings of the surfaces S1, S2, S3. Alternatively, the radii of curvature may also be taken from the design data of surface S1 or may be measured with the aid of the autocollimator 22 in an additional measuring procedure. This is because the radius of curvature in the case of a spherical lens is equal to the spacing between the centre of curvature K1 and an arbitrary point on the optical surface S1. The position of such a point can be measured simply by the focal point 48 of the zoom lens 46 being placed onto the optical surface S1. The image of the pinhole diaphragm 40 arising on the image sensor 50 then has its maximal intensity.

It is to be emphasised that for the spacing, likewise to be taken into consideration, between the first surface S1 and the second surface S2 along the reference axis 34, recourse is not had to design data, as in the state of the art, but rather to the measured value for this spacing, which was ascertained beforehand with the aid of the interferometer 24.

In the case of all further optical surfaces of the test specimen 62 the measurement of the positions of the centres of curvature is undertaken in the same way. In this connection the positions of the centres of curvature of all the surfaces situated ahead and the spacings measured by the interferometer between the surfaces situated ahead in accordance with steps ST3 and ST4 are always taken into consideration computationally. In this way, a spatial arrangement of all the centres of curvature K1, K2, K3 is obtained.

If a survey of the positions of the centres of curvature K1, K2, K3 has already been carried out beforehand in order to determine the optical axis 92 of the test specimen 62 provisionally and to be able to orient the test specimen 62 on the reference axis 34 for the purpose of the spacing measurement, this measurement in step ST2 can be repeated, since under certain circumstances a higher accuracy in connection with the measurement of the positions of the centres of curvature K1, K2, K3 is obtained with the now better-oriented test specimen 62. But alternatively for this purpose it is likewise possible to use the results of measurement already obtained, i.e. the patterns of light obtained on the image sensor 50 for the individual surfaces S1, S2, S3, and to take into consideration the spacings between the surfaces S1, S2, S3, previously surveyed accurately in step ST1, merely in the computational evaluation. Steps ST1 and ST2 are then carried out in the reverse order.

Furthermore, it may be expedient to carry out the measurement of the positions of the centres of curvature K1, K2, K3 not, as described above, in the order of the optical surfaces S1, S2, S3 but rather in the order of the desired centres of curvature thereof. In the case of the test specimen shown in FIG. 5, this would mean that the focal point 48 of the autocollimator 22 is not placed, to begin with, at the expected centre of curvature K1 of the first surface S1 but rather at the centre of curvature K3 of surface S3, which is situated closest to the autocollimator 22. After conclusion of this measuring step, the zoom lens 46 is displaced in such a way that the focal point 48 is placed approximately at the centre of curvature situated second-closest—here centre of curvature K2 of the second surface S2—etc. In this way it is ensured that the zoom lens 46 travels minimal displacement paths between the measuring steps. For the same reason, the measurement may also be carried out in the reverse order, i.e. beginning with the measurement of the position of that centre of curvature which is situated furthest away from the autocollimator. In this case the fact is exploited in each instance that the computational consideration of the measured positions of the centres of curvature and of the spacings in accordance with steps ST3 and ST4 can also be carried out in a common iterative evaluation process after the recording of all the measured data.

The result of the measurement is a very precise determination of the centres of curvature of the test specimen 62, which is not even falsified by deviations of the actual spacings between the optical surfaces S1, S2, S3 from the design data. From the exactly ascertained centres of curvature and from the measured spacings, the computer 26 can also determine the radii of curvature exactly. Very accurately-measured air separations and centre thicknesses of the lenses of the test specimen 62 are obtained additionally as useful results of measurement. Consequently, starting from a set of design data—which, inter alia, contains desired values for the positions of the centres of curvature, the air separations between the lenses and the centre thicknesses of the lenses—a corrected actual data set is obtained in which the stated desired values have been replaced by highly accurate measured values.

The invention claimed is:

1. A method for measuring positions of centres of curvature of optical surfaces of a multi-lens optical system, comprising the following steps:
 a) provisionally determining an optical axis of the optical system using an optical angle-measuring device;
 b) orienting the optical system and an interferometer with respect to one another in such a way that the optical axis provisionally determined in step a) is aligned with a reference axis;
 c) measuring spacings between the optical surfaces along the reference axis using the interferometer;
 d) measuring the positions of the centres of curvature of the optical surfaces using the optical angle-measuring device, wherein in the course of a measurement of the centre of curvature of an optical surface situated within the optical system
  the measured positions of the centres of curvature of the optical surfaces situated between this optical surface and the optical angle-measuring device and
  the spacings between the optical surfaces measured in step c)
 are taken into consideration computationally.

2. The method of claim 1, wherein step a) comprises the step of provisionally measuring the positions of the centres of curvature of at least some of the optical surfaces using the optical angle-measuring device, and wherein the positions of the centres of curvature provisionally measured are used for provisionally determining the optical axis.

3. The method of claim 2, wherein the optical axis provisionally determined in step a) is defined by a regression line through the positions of the centres of curvature that have been provisionally measured by the optical angle-measuring device.

4. The method of claim 1, wherein, for the purpose of provisional determination of the optical axis, test light is coupled in from one side of the optical system, and on an opposite side test light emanating from the optical system is detected in a location-resolved manner by a light-sensor of the optical angle-measuring device.

5. The method of claim 4, wherein the optical system is rotated about the reference axis during the location-resolved detection of the test light, and wherein from the change in the location of impingement of the test light on the light-sensor during the rotation the deviation of the optical axis from the reference axis is inferred.

6. The method of claim 4, wherein the test light is generated by a light-source arranged in the interferometer.

7. The method of claim 1, wherein the measurement of the spacings in step c) and the measurement of the positions of the centres of curvature in step d) are carried out from the same side of the optical system.

8. The method of claim 7, wherein spacing-measuring light used by the interferometer and angle-measuring light used by the optical angle-measuring device are directed onto the optical system by common focusing optics.

9. The method of claim 1, wherein the interferometer is a short-coherence interferometer.

10. An apparatus for measuring the positions of centres of curvature of optical surfaces of a multi-lens optical system, comprising:
 a) an interferometer that is configured to measure spacings between the optical surfaces along a reference axis;
 b) an optical angle-measuring device that is configured to measure positions of the centres of curvature of the optical surfaces,
 c) a computing unit which is configured to take into consideration computationally, when measuring the position of the centre of curvature of an optical surface situated within the optical system,
  the measured positions of the centres of curvature of the optical surfaces situated between this optical surface and the angle-measuring device and
  the spacings between the optical surfaces measured by the interferometer.

11. The apparatus of claim 10, comprising a test-light source that is configured to couple test light into the optical system from one side of said system, and a location-resolving light-sensor that is configured to detect in a location-resolved manner test light emanating on the opposite side of the optical system.

12. The apparatus of claim 11, wherein the test-light source is integrated into the interferometer.

13. The apparatus of claim 10, comprising a rotating mechanism that is configured to rotate the optical system about the reference axis.

14. The apparatus of claim 10, wherein the interferometer and the optical angle-measuring device are arranged on the same side of the optical system.

15. The apparatus of claim 14, comprising a focusing optics, through which both spacing-measuring light generated by the interferometer and angle-measuring light generated by the optical angle-measuring device are directed onto the optical system.

16. The apparatus of claim 10, wherein the interferometer is a short-coherence interferometer.

17. A method for measuring positions of centres of curvature of optical surfaces of a multi-lens optical system, comprising the following steps:
 a) provisionally determining an optical axis of the optical system, wherein test light is coupled in from one side of the optical system, and on an opposite side test light emanating from the optical system is detected by a location-resolved light-sensor;
 b) the optical system and an interferometer are oriented with respect to one another in such a way that the optical axis provisionally determined in step b) is aligned with a reference axis;
 c) measuring spacings between the surfaces along the reference axis using an interferometer;
 d) measuring again the positions of the centres of curvature of the surfaces using the optical angle-measuring device, whereby in the course of a measurement of the centre of curvature of a surface situated within the optical system the measured positions of the centres of curvature
  of the surfaces situated between this surface and the angle-measuring device and
 the spacings between the surfaces measured in step d) are taken into consideration computationally.

18. A method for measuring positions of centres of curvature of optical surfaces of a multi-lens optical system, comprising the following steps:
- a) provisionally determining an optical axis of the optical system;
- b) orienting the optical system in such a way that the optical axis provisionally determined in step a) is aligned with a reference axis;
- c) measuring spacings between the optical surfaces along the reference axis;
- d) measuring the positions of the centres of curvature of the optical surfaces using the optical angle-measuring device, wherein in the course of a measurement of the centre of curvature of an optical surface situated within the optical system;
    - the measured positions of the centres of curvature of the optical surfaces situated between this optical surface and the angle-measuring device and
- the spacings between the optical surfaces measured in step c) are taken into consideration computationally.

* * * * *